US012604997B2

(12) United States Patent
Gessi

(10) Patent No.: US 12,604,997 B2
(45) Date of Patent: Apr. 21, 2026

(54) DISPLAY SYSTEM FOR HYDROTHERMAL SANITARY COMPONENTS AND ASSOCIATED METHOD

(71) Applicant: GESSI S.P.A., Serravalle Sesia (IT)

(72) Inventor: Gian Luca Gessi, Serravalle Sesia (IT)

(73) Assignee: GESSI S.P.A., Serravalle Sesia (IT)

(*) Notice: Subject to any disclaimer, the term of this patent is extended or adjusted under 35 U.S.C. 154(b) by 0 days.

(21) Appl. No.: 17/502,990

(22) Filed: Oct. 15, 2021

(65) Prior Publication Data

US 2022/0117413 A1 Apr. 21, 2022

(30) Foreign Application Priority Data

Oct. 15, 2020 (EP) .................................... 20202153

(51) Int. Cl.

| | |
|---|---|
| ***A47F 5/08*** | (2006.01) |
| *F21V 21/02* | (2006.01) |
| *F21V 33/00* | (2006.01) |

(52) U.S. Cl.

CPC ............ *A47F 5/083* (2013.01); *A47F 5/0807* (2013.01); *A47F 5/0815* (2013.01); *A47F 5/08* (2013.01);

(Continued)

(58) Field of Classification Search

CPC ...... A47F 5/083; A47F 5/0815; A47F 5/0838; A47F 5/0823; A47F 5/0807;

(Continued)

(56) References Cited

U.S. PATENT DOCUMENTS

| | | | | |
|---|---|---|---|---|
| 1,760,494 A * | 5/1930 | Hammer | A47K 1/02 312/297 |
| 1,883,787 A * | 10/1932 | Head | B67D 1/06 222/129 |

(Continued)

FOREIGN PATENT DOCUMENTS

| | | |
|---|---|---|
| AT | 511371 | 11/2012 |
| DE | 102016201481 A1 | 8/2017 |

(Continued)

OTHER PUBLICATIONS

EP Extended Search Report in European Application No. 20202153.1, dated Aug. 18, 2021, 8 pages.

(Continued)

*Primary Examiner* — Devin K Barnett
(74) *Attorney, Agent, or Firm* — Fish & Richardson P.C.

(57) ABSTRACT

The present disclosure relates to a display system (1, 1') for hydrothermal sanitary components (10*a*-10*d*), comprising:

at least a first device or module (1), comprising an exhibition panel (2) configured to lay, in use, at least partially on a plane substantially inclined with respect to a horizontal plane and destined and configured to support a plurality of hydrothermal sanitary components (10*a*-10*d*); and at least a retainer (2*f*, 4, 10*p*, 11) configured to realize a removable connection between the exhibition panel (2) and the hydrothermal sanitary components (10*a*-10*d*), the retainer (2*f*, 4, 10*p*, 11) being further destined and configured to allow a user to arrange, and repeatedly re-arrange multiple times, the hydrothermal sanitary components (10*a*-10*d*) on the exhibition panel (2) according to a plurality of user-defined and re-definable patterns or spatial configurations, simulating a real (Continued)

installation of said hydrothermal sanitary components (10*a*-10*d*) in an operating environment, such as a bathroom or similar.

11 Claims, 3 Drawing Sheets

(52) U.S. Cl.
CPC ........ *A47F 5/0869* (2013.01); *A47G 2200/10* (2013.01); *F21V 21/02* (2013.01); *F21V 33/0012* (2013.01); *F21V 33/004* (2013.01); *Y10S 211/01* (2013.01)

(58) Field of Classification Search
CPC ..... A47F 5/0869; A47F 5/08; A47G 2200/10; Y10S 211/01; F21V 21/00; F21V 21/02; F21V 33/0012; F21V 33/004
See application file for complete search history.

(56) References Cited

U.S. PATENT DOCUMENTS

| | | | | | |
|---|---|---|---|---|---|
| 2,177,905 | A * | 10/1939 | Mckeehan | B43L 5/022 | 211/DIG. 1 |
| 2,457,032 | A * | 12/1948 | Case | A47G 21/14 | 211/DIG. 1 |
| 2,621,807 | A * | 12/1952 | Rendich | B23Q 16/001 | 269/297 |
| 2,733,113 | A * | 1/1956 | Humbargar | A47B 81/007 | 312/249.7 |
| 2,743,022 | A * | 4/1956 | Mapson | A47F 5/0823 | 248/222.51 |
| 2,966,992 | A * | 1/1961 | Dunkelberger | B25H 3/04 | 211/DIG. 1 |
| 3,464,134 | A * | 9/1969 | Franklin | H01F 7/0215 | 40/621 |
| 4,304,382 | A * | 12/1981 | Jelen | A47F 5/0823 | 248/222.12 |
| 4,953,714 | A * | 9/1990 | Paul | A47F 5/0884 | 211/DIG. 1 |
| 4,979,625 | A * | 12/1990 | Johnson | A47G 1/0616 | 211/DIG. 1 |
| 5,433,416 | A | 7/1995 | Johnson | | |
| 5,746,329 | A * | 5/1998 | Rondeau | H01F 7/0252 | 211/DIG. 1 |
| 5,760,668 | A * | 6/1998 | Testa | B23Q 3/1546 | 211/DIG. 1 |
| 5,853,092 | A * | 12/1998 | Goodman | A47F 5/0823 | 211/106.01 |
| D405,999 | S * | 2/1999 | Lee | D6/569 | |
| 6,129,220 | A * | 10/2000 | Decossas | A47F 5/0823 | 211/13.1 |
| 6,145,676 | A * | 11/2000 | Gross | B25H 3/04 | 211/70.6 |
| 6,436,357 | B1 * | 8/2002 | Frieze | A61L 2/26 | 422/292 |
| 6,575,313 | B1 * | 6/2003 | Chen | B25H 3/06 | 211/DIG. 1 |
| 6,598,752 | B1 * | 7/2003 | Davidov | G11B 33/0411 | 211/DIG. 1 |
| 6,626,303 | B1 * | 9/2003 | Moodie | A47F 5/0807 | 211/70.7 |
| 6,763,956 | B2 * | 7/2004 | Woods | A47B 73/00 | 211/74 |
| 6,811,127 | B1 * | 11/2004 | Shiao | B25H 3/04 | 211/DIG. 1 |
| 7,861,860 | B2 * | 1/2011 | Bettenhausen | A61L 2/26 | 206/439 |
| 7,971,736 | B1 * | 7/2011 | Stewart | A47G 21/14 | 248/37.3 |
| 8,499,943 | B1 * | 8/2013 | Neldner | A47J 45/02 | 211/DIG. 1 |
| 8,517,187 | B1 * | 8/2013 | Westphal | A47K 1/09 | 248/110 |
| 8,770,416 | B1 * | 7/2014 | Guida | B43L 1/008 | 211/DIG. 1 |
| 8,981,887 | B1 * | 3/2015 | Erlandsson | H01F 7/0215 | 335/306 |
| 9,814,328 | B2 * | 11/2017 | Martino | F42B 10/34 | |
| D828,512 | S * | 9/2018 | Liu | D23/238 | |
| 10,405,676 | B1 * | 9/2019 | Underwood | F16B 1/00 | |
| 10,421,184 | B2 * | 9/2019 | Kwak | A47F 5/0807 | |
| 10,736,273 | B1 * | 8/2020 | Kacines | F16M 13/022 | |
| 10,835,339 | B2 * | 11/2020 | Krensky | A61B 50/3001 | |
| 10,888,178 | B2 * | 1/2021 | Martino | B63B 1/30 | |
| 11,517,128 | B1 * | 12/2022 | Nieto | A47B 87/0207 | |
| 2001/0002521 | A1 * | 6/2001 | Maniezzo | A47F 5/0823 | 52/27 |
| 2004/0173719 | A1 * | 9/2004 | Mitchell | A47G 23/0225 | 248/311.2 |
| 2004/0226902 | A1 * | 11/2004 | Lin | A47K 10/10 | 211/87.01 |
| 2004/0256335 | A1 * | 12/2004 | Sholem | B25H 3/04 | 211/DIG. 1 |
| 2005/0056655 | A1 * | 3/2005 | Gary | B65D 25/24 | 220/737 |
| 2005/0109717 | A1 * | 5/2005 | Armstrong | B41K 1/58 | 211/DIG. 1 |
| 2006/0201956 | A1 * | 9/2006 | Romo | B65D 81/3879 | 220/737 |
| 2007/0012832 | A1 | 1/2007 | Ottens et al. | | |
| 2007/0074985 | A1 * | 4/2007 | Evans | B25H 3/003 | 206/376 |
| 2007/0144926 | A1 | 6/2007 | Bettenhausen et al. | | |
| 2007/0176069 | A1 * | 8/2007 | Mitchell | A47G 23/0225 | 248/311.2 |
| 2007/0176070 | A1 * | 8/2007 | Mitchell | A47G 23/0225 | 248/311.2 |
| 2007/0290107 | A1 * | 12/2007 | Lang | A47F 5/0815 | 248/220.31 |
| 2010/0276382 | A1 * | 11/2010 | Antonioni | A47F 5/0807 | 211/59.2 |
| 2011/0155934 | A1 * | 6/2011 | Guler | E03D 3/06 | 251/129.04 |
| 2012/0012542 | A1 * | 1/2012 | Brown | A47F 5/0043 | 211/26 |
| 2014/0263116 | A1 * | 9/2014 | Wojciechowski | A47F 5/0807 | 211/85.2 |
| 2014/0319988 | A1 * | 10/2014 | Dietz | A47F 10/00 | 312/326 |
| 2020/0121098 | A1 | 4/2020 | Martino | | |
| 2020/0205586 | A1 * | 7/2020 | Arradondo | A47F 5/0006 | |
| 2020/0270853 | A1 * | 8/2020 | Le | G01F 15/06 | |
| 2020/0323364 | A1 * | 10/2020 | Fleega | A47F 5/005 | |
| 2022/0243478 | A1 * | 8/2022 | Lee | E04B 2/74 | |

FOREIGN PATENT DOCUMENTS

| | | |
|---|---|---|
| DE | 202018103050 | 9/2019 |
| EP | 1205900 A1 | 5/2000 |
| EP | 3420857 | 1/2019 |
| JP | H 09151618 A | 6/1997 |
| KR | 100979679 | 9/2010 |
| WO | WO 2000054634 | 9/2000 |
| WO | WO 2019228658 A1 | 12/2019 |

OTHER PUBLICATIONS

EP Extended Search Report in European Application No. 20202153.1, dated Nov. 25, 2025, 8 pages.
EP Notice of Opposition in European Application No. 20202153.1, mailed on Nov. 20, 2025, 5 pages.

* cited by examiner

FIG.1
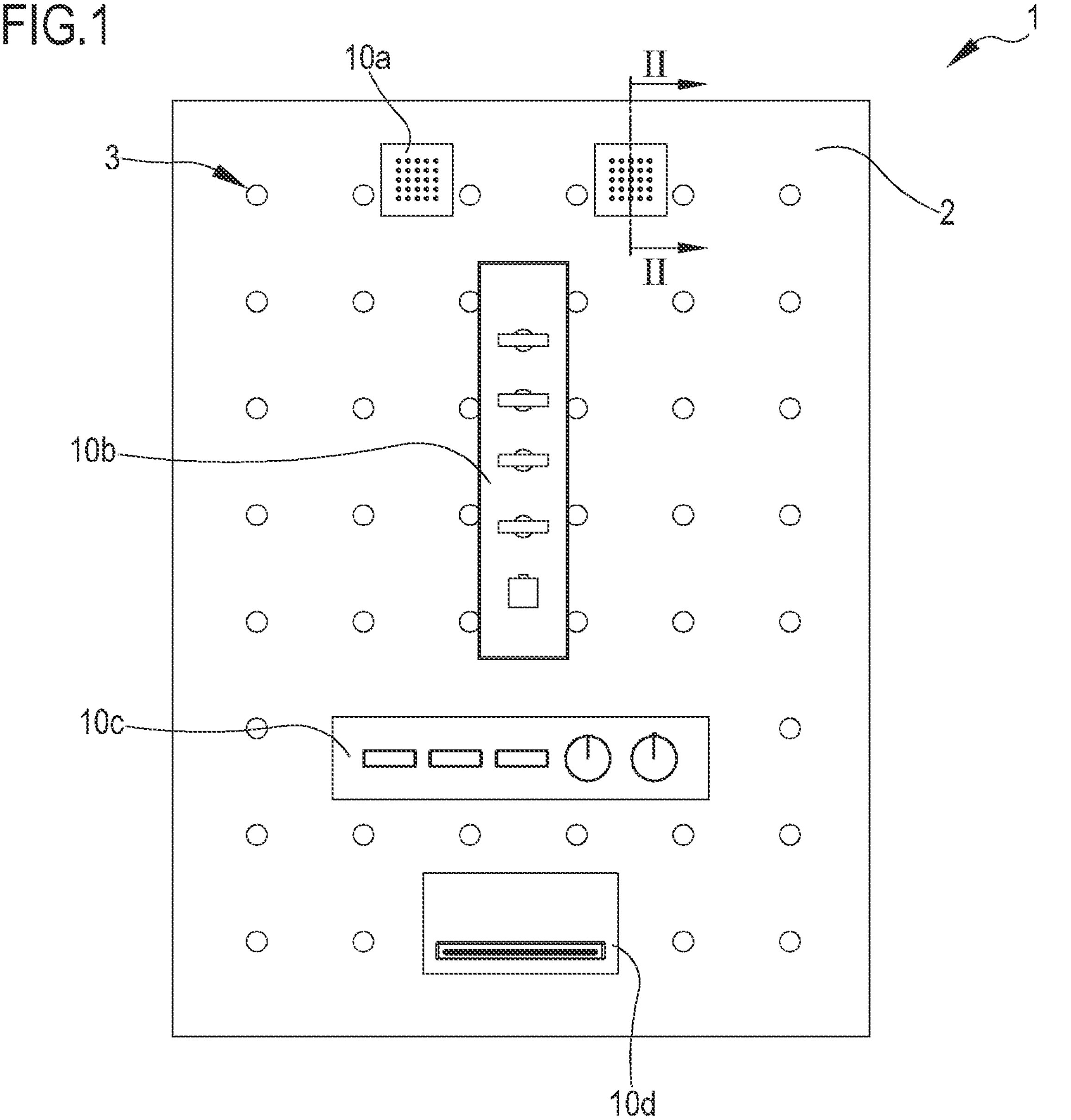
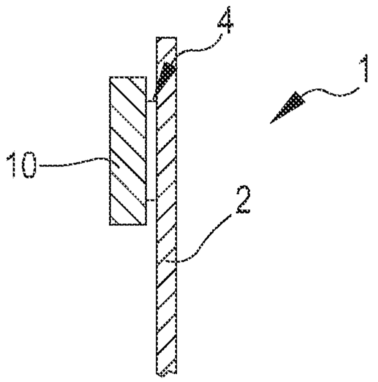
FIG.2
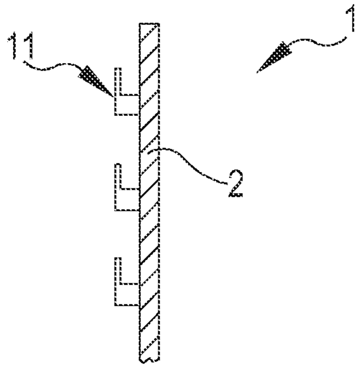
FIG.3

FIG.5
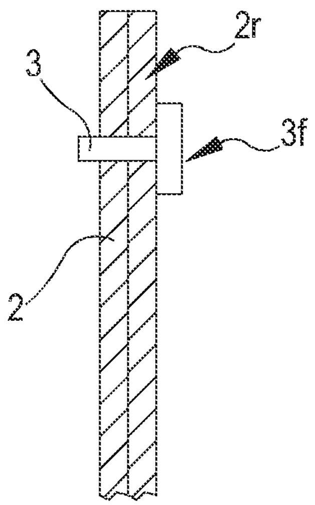
FIG.6
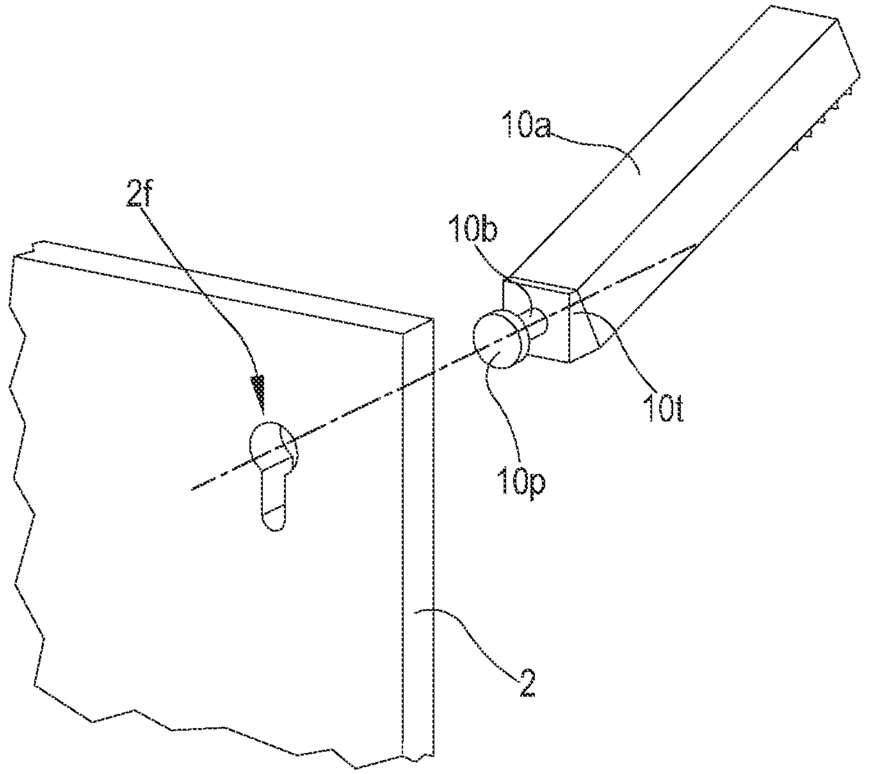
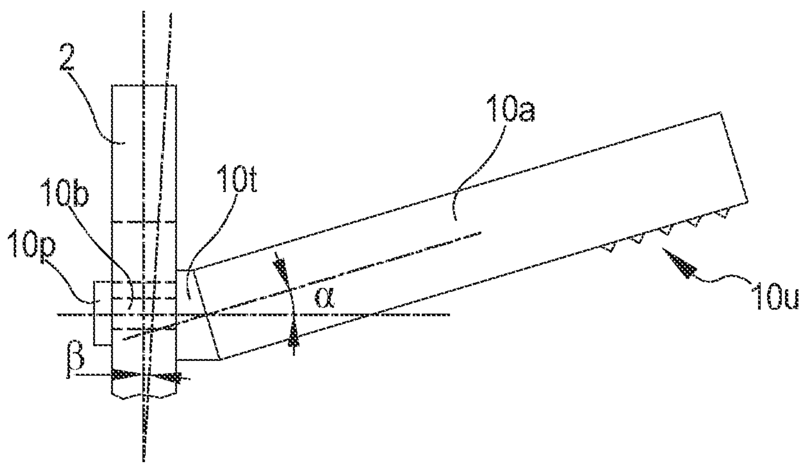
FIG.7

DISPLAY SYSTEM FOR HYDROTHERMAL SANITARY COMPONENTS AND ASSOCIATED METHOD

CROSS-REFERENCE TO RELATED APPLICATIONS

This application claims priority to European Patent Application No. 20202153.1, filed on Oct. 15, 2020, which is hereby incorporated by reference in its entirety.

FIELD OF THE DISCLOSURE

The present disclosure refers to the field of displaying systems for objects, and in detail concerns a display system for hydrothermal sanitary components.

BACKGROUND

Today's bathrooms comprise several sanitary devices or articles—such as sinks, toilets, bidets, showers, bathtubs—and accessories—such as, for instance, towel holders, and also water and hot water distribution or heating articles like towel heaters, boilers or faucets. These devices are also known with the name of hydrothermal sanitary components, devices or articles.

In many cases the evolution of these articles and accessories moved from simple and traditionally designed articles and accessories to design articles and design accessories, which led the producing firms to the possibility of realizing very particular configurations of items, with a peculiar aesthetic appearance.

Typically, users tend to choose, for their bathrooms, sanitary articles produced by the same Firm, in order to provide a uniform aesthetic appearance throughout the bathroom.

In the past, when designing a bathroom configuration, those articles were placed without considering the overall aesthetic appearance of the overall assembly. In recent years, interior designers and even traditional users paid more attention to the spatial distribution of these devices or articles, in particular the global aesthetic effect thereby provided.

The Applicant noticed that the more the items involve particular shapes or designs, the more it is difficult to arrange them according to the right configuration to provide the right aesthetic appearance to the user.

In very recent years, interior designing, or environment simulation, software programs have been developed to help designers and users for simulating the aesthetic appearance of items to be arranged within a room. These software programs that can provide for very accurate virtual rendering of items arranged in a confined space, but they cannot give the user a really complete aesthetic impression that the items arranged in the bathroom have in the real environment.

Moreover such systems are suitable for remotely simulating a room environment, but are less suitable for live presentations in show rooms and shops.

The scope of the present disclosure is to provide a display system, a kit and method helping to solve the aforementioned drawbacks, and in detail contributing to allow the user to have a precise simulation of how the real installation of the chosen hydrothermal sanitary component would appear in a real bathroom.

SUMMARY

The object of the present disclosure will be described in accordance to several aspects, hereinafter disclosed; those aspects can be combined together, with portions of the description and with one or more of the annexed claims.

According to a first aspect is herewith disclosed a display system (1, 1') for hydrothermal sanitary components (10*a*-10*d*), comprising:

at least a first device or module (1), comprising an exhibition panel (2) configured to lay, in use, at least partially on a plane substantially inclined with respect to a horizontal plane and destined and configured to support a plurality of hydrothermal sanitary components (10*a*-10*d*), and at least a retainer (2*f*, 4, 10*p*, 11) configured to realize a removable connection between the exhibition panel (2) and the hydrothermal sanitary components (10*a*-10*d*), the retainer (2*f*, 4, 10*p*, 11) being further destined and configured to allow a user to arrange, and repeatedly re-arrange multiple times, the hydrothermal sanitary components (10*a*-10*d*) on the exhibition panel (2) according to a plurality of user-defined and re-definable patterns or spatial configurations, simulating a real installation of said hydrothermal sanitary components (10*a*-10*d*) in an operating environment, such as a bathroom or similar.

According to another non-limiting aspect, the first module (1) is a floor standing module, and is provided with a supporting frame configured to be laid, or fixed, to the ground, the supporting frame being configured to support said exhibition panel (2).

According to another non-limiting aspect, the exhibition panel (2) is arranged and configured to lay, in use, at least partially on a plane which is substantially vertical with respect to the ground.

According to another non-limiting aspect, the exhibition panel (2) has a substantially planar structure and/or has a substantially planar front face.

According to another non-limiting aspect, the exhibition panel (2) comprises an outer perimeter, the user-defined and re-definable pattern or spatial configuration is realized within the outer perimeter and wherein the retainer (2*f*, 4, 10*p*, 11) is destined and configured to allow the user to arrange, and repeatedly re-arrange multiple times, the hydrothermal sanitary components (10*a*-10*d*) on the exhibition panel (2) in any position within the outer perimeter.

According to another non-limiting aspect, said retainer (2*f*, 4, 10*p*, 11) comprises at least a respective first retention element (4) configured and destined to be engaged, optionally irremovably engaged, to a respective hydrothermal sanitary component (10*a*-10*d*).

According to another non-limiting aspect, at least one front surface of the exhibition panel (2) is specifically configured and destined to directly contact and interact with at least a part of the first retention element (4) to realize said removable connection; and/or wherein said retainer (2*f*, 4, 10*p*, 11) is provided with at least a second retention element (11) which is attached, optionally irremovably attached, or is part of, or is realized integrally with, or is, the exhibition panel (2), the second retention element (11) being configured and destined to interact with a hydrothermal sanitary component (10*a*-10*d*) or with at least a first retention element (4) coupled to a hydrothermal sanitary component (10*a*-10*d*) to realize said removable connection.

According to another non-limiting aspect, the first retention element (4) and/or the second retention element (11) comprise at least one magnetic and/or at least one magnetically attractable element and/or wherein the second retention element (11) extends substantially along the entire surface of the exhibition panel (2) or wherein the exhibition panel (2)

comprises a plurality of second retention elements (11) arranged according to a predefined pattern or spatial configuration on said exhibition panel (2), preferably reciprocally spaced and/or equally spaced.

According to another non-limiting aspect, the at least one magnetic or magnetically attractable element (11) is, or coincides, substantially to the exhibition panel (2) or to at least part, optionally at least ¾ of the whole area of the exhibition panel (2).

According to another non-limiting aspect, the retainer (2*f*, 4, 10*p*, 11) is configured for realizing a removable connection with said hydrothermal sanitary components (10*a*-10*d*) at a substantially rear portion thereof, optionally wherein when at least one hydrothermal sanitary component (10*a*-10*d*) is engaged to the retainer (4, 10*p*, 11), at least part of said at least one retention element (2*f*, 4, 10*p*, 11) is hidden from the sight of a user observing the first module (1) substantially from a front direction by said hydrothermal sanitary component (10*a*-10*d*), optionally wherein the entire retention element (2*f*, 4, 10*p*, 11) is hidden from the sight of a user observing the first module (1) substantially from a front direction by said hydrothermal sanitary component (10*a*-10*d*).

According to another non-limiting aspect, the exhibition panel (2) comprises a plurality of marking elements (3) arranged at specific positions on the exhibition panel (2), optionally at a front surface of the exhibition panel (2) and/or visually detectable on the front surface of the exhibition panel (2), the plurality of marking elements (3) realizing a predefined visual aiding pattern helping an arrangement of at least one hydrothermal sanitary component (10*a*-10*d*) on the exhibition panel (2).

According to another non-limiting aspect, the plurality of marking elements (3) realize a predefined visual aiding pattern helping an arrangement of at least one hydrothermal sanitary component (10*a*-10*d*) on the exhibition panel (2).

According to another non-limiting aspect, the marking elements (3) comprise or are at least part of the second retention elements (11).

According to another non-limiting aspect, the marking elements (3) differ, in particular spatially differ, from the second retention elements (11), or can be physically detached from the second retention elements (11).

According to another non-limiting aspect, the marking elements (3) are removable form the exhibition panel (2) and/or are removably connected to the exhibition panel (2) at a front surface thereof.

According to another non-limiting aspect, the exhibition panel (2) comprises a front element and a back element (2*r*).

According to another non-limiting aspect, the front element and the back element (2*r*) are co-planar, and/or the back element (2*r*) lays, at least locally, on a plane which is parallel to the plane on which, at least locally, the front element lays.

According to another non-limiting aspect, the front element and the back element (2*r*) are configured to be in a reciprocal contact.

According to another non-limiting aspect, the first module (1) comprises at least one plug configured to keep the front element and the back element (2*r*) in said reciprocal contact and/or configured to keep the front element and the back element (2*r*) in a reciprocal predefined position.

According to another non-limiting aspect, the front element and the back element (2*r*) comprise at least one respective through hole configured to allow the passage of said plug, optionally comprising a plurality of respective though-holes arranged according to a same, predefined, spatial pattern, the plurality of through holes being configured to allow the passage of said plug.

According to another non-limiting aspect, an assembly comprising the through hole and at least one plug is configured to realize a bayonet-like coupling.

According to another non-limiting aspect, the marking element (3) comprises said plug, and/or the plug is integral with said marking element (3).

According to another non-limiting aspect, the marking element (3) comprise at least one strip-like element, optionally configured to simulate a conduit and/or an electrical wiring connected in use to the hydrothermal component (10*a*-10*d*).

According to another non-limiting aspect, the strip-like element is configured to be magnetically connected to a front surface of the exhibition panel (2).

According to another non-limiting aspect, the retainer (2*f*, 4, 10*p*, 11) is configured to realize a bayonet-like connection, in particular a bayonet-like removable connection, between the exhibition panel (2) and the hydrothermal sanitary component (10*a*-10*d*).

According to another non-limiting aspect, the retainer (2*f*, 4, 10*p*, 11) is configured to realize a bayonet-like connection, in particular a bayonet-like removable connection, between the exhibition panel (2) and the hydrothermal sanitary component (10*a*-10*d*), and wherein the retainer (2*f*, 4, 10*p*, 11) comprises at least one shaped though-hole (2*f*) practiced on said exhibition panel (2); the shaped through hole (2*f*) being configured to couple, in use, with a retention pin (10*p*) arranged at a portion, optionally a rear portion, of the hydrothermal sanitary component (10*a*-10*d*).

According to another non-limiting aspect, the retainer (2*f*, 4, 10*p*, 11) comprises at least one retention pin (10*p*) arranged on the exhibition panel (2), optionally protruding from a front surface of the exhibition panel (2), the retention pin (10*p*) being configured to couple, in use, with a shaped through hole (2*f*) practiced on a portion, optionally a rear portion, of the hydrothermal sanitary component (10*a*-10*d*).

According to another non-limiting aspect, the retainer (2*f*, 4, 10*p*, 11) comprises at least one retention pin (10*p*) arranged on the exhibition panel (2), optionally protruding from a front surface of the exhibition panel (2), the retention pin (10*p*) being configured to couple, in use, with a shaped through hole (2*f*) practiced on a compensation element (10*t*) arranged between exhibition panel (2) and the hydrothermal sanitary component (10*a*-10*d*) and configured to compensate a local distortion or deformation or inclination of said exhibition panel (2), optionally configured to compensate the local distortion or deformation or inclination for a predetermined compensation angle (α), optionally wherein said compensation angle (α) at least partially compensates a distortion or deformation or inclination angle (β) locally assumed by the exhibition panel (2) due to a weight and/or a lever force at least locally exerted on the exhibition panel (2) by the hydrothermal sanitary element (10*a*-10*d*).

According to another non-limiting aspect, the retainer (2*f*, 4, 10*p*, 11) comprises at least one shaped though-hole (2*f*) practiced on said exhibition panel (2); the shaped through hole (2*f*) being configured to couple, in use, with a retention pin (10*p*) arranged at a portion, optionally a rear portion, of a compensation element (10*t*) arranged between exhibition panel (2) and the hydrothermal sanitary component (10*a*-10*d*) and configured to compensate a local distortion or deformation or inclination of said exhibition panel (2), optionally configured to compensate the local distortion or deformation or inclination of said exhibition panel (2) for a predetermined compensation angle (α), optionally wherein said compensation angle (α) at least partially compensates a distortion or deformation or inclination angle (β) locally assumed by the exhibition panel (2) due to a weight and/or a lever force at least locally exerted on the exhibition panel (2) by the hydrothermal sanitary element (10*a*-10*d*).

According to another non-limiting aspect, the assembly realized by the shaped through hole (2*f*) and by the retention pin (10*p*) realizes, in use, a bayonet-like coupling, and/or the retainer (2*f*, 4, 10*p*, 11) is configured to realize a bayonet-like connection, in particular a bayonet-like removable connection, between the exhibition panel (2) and the hydrothermal sanitary component (10*a*-10*d*).

According to another non-limiting aspect, the retention pin (10*p*) comprises an elongated body and a retention head, the retention head having a size, optionally a diameter, larger than a size, optionally a diameter, of the elongated body.

According to another non-limiting aspect, the shaped through hole (2*f*) comprises a first, larger, portion suitable to allow the introduction of the retention head of the retention pin (10*p*), and a second, smaller, portion that is configured to allow the introduction of the elongated body.

According to another non-limiting aspect, the display system further comprises a second device or module (1') configured for removably housing a plurality of hydrothermal sanitary components (10*a*-10*d*) according to a predefined displaying pattern or configuration, preferably grouped per category and/or type, the second module (1') comprising at least one movable panel (1*e*) having a displaying surface at which at least one of said plurality of hydrothermal sanitary components (10*a*-10*d*) is removably held.

According to another non-limiting aspect, the movable panel (1*e*) can be arranged at least: in a first spatial orientation corresponding to a first configuration of the second module (1'), optionally in which the displaying surface mainly extends orthogonally to a depth axis of said second module (1') and frontally with respect to a user of the second module (1'); and in a second spatial orientation rotated, preferably substantially orthogonally, with respect to the first spatial orientation and corresponding to a second configuration of the second module (1').

According to another non-limiting aspect, the displaying surface extends parallel to the depth axis of said second module (1').

According to another non-limiting aspect, the movable panel (1*e*) can be arranged at least in correspondence of a first position at a first distance with respect to a lateral end of the second module (1') and in correspondence of a second position at a second distance, different from the first distance, with respect to the lateral end of the second module (1'), optionally by translation.

According to another non-limiting aspect, the movable panel (1*e*) can be moved in a composite movement comprising a rotation with respect to a vertical axis thereof and/or a translation in a direction substantially orthogonal to said vertical axis.

According to another non-limiting aspect, the first module (1') comprises at least a retainer (2*f*, 4, 10*p*, 11) configured to realize a removable connection between the movable panel (1*e*) and the hydrothermal sanitary components (10*a*-10*d*), said retainer (2*f*, 4, 10*p*, 11) being provided with at least a second retention element (11) which is attached, optionally irremovably attached, or is part of, or is realized integrally with, or is, the movable panel (1*e*).

According to another non-limiting aspect, the second retention element (11) is configured and destined to interact with a hydrothermal sanitary component (10*a*-10*d*) or with at least a first retention element (4) coupled to a hydrothermal sanitary component (10*a*-10*d*) to realize said removable connection.

According to another non-limiting aspect, the second module (1') is a floor-standing module provided with a supporting frame housing and/or realizing at least one rail (1*r*) configured for allowing the motion of the panel (1*e*) at least between the first and the second spatial orientation and/or at least between the first position and the second position.

According to another non-limiting aspect, the at least one rail (1*r*) is configured for allowing the rotation of the movable panel (1*e*) around its vertical axis at least from the first spatial orientation to the second spatial orientation.

According to another non-limiting aspect, the marking elements (3) comprise pins, optionally substantially round pins, which are substantially co-planar with the front surface of the exhibition panel (2).

According to another non-limiting aspect, the marking elements (3) comprise a plurality of lights arranged behind the front surface of the exhibition panel.

According to another non-limiting aspect, the marking elements (3) are configured for emitting light towards the front portion of the first module (1) and/or are configured for emitting light through the exhibition panel (2).

According to another non-limiting aspect, the marking elements (3) comprise each at least on light-emitting module.

According to another non-limiting aspect, the light-emitting module is arranged behind the exhibition panel (2).

According to another non-limiting aspect, the light-emitting module comprises at least a first operative configuration wherein it does not emit light and a second operative configuration wherein it emits light.

According to another non-limiting aspect, the light-emitting module is configured to emit light in a direction toward the user when the user is arranged substantially in front of said exhibition panel (2).

According to another non-limiting aspect, the light-emitting module is configured to emit light in a direction at least locally substantially orthogonal to the plane on which at least a portion of the exhibition panel (2) lays.

According to another non-limiting aspect, the exhibition panel (2) extends at least for a height above 140 cm or 150 cm, or 160 cm or 170 cm, or 180 cm or 190 cm.

According to another non-limiting aspect, at least the second module (1') comprises a plurality of drawers (1*d*) configured to hold and/or contain at least one hydrothermal sanitary component (10*a*-10*d*).

According to another non-limiting aspect, at least said first module (1) and/or said second module (1') is/are modular modules.

According to another non-limiting aspect, the second module (1') comprises a plurality of sub-modules (1*c*, 11); said sub-modules (1*c*, 11) optionally comprising at least one between a first sub-module constituting a central portion (1*c*) of the second module (1') and a second, optionally a second and a third, sub-module (11) constituting a lateral sub-module of the second module (1').

According to another aspect, it is herewith disclosed an exhibition device or module (1') configured for removably housing a plurality of hydrothermal sanitary components (10*a*-10*d*) according to a predefined displaying pattern or configuration, preferably grouped per category and/or type, the second module (1') comprising at least one movable panel (1*e*) having a displaying surface at which at least one of said plurality of hydrothermal sanitary components (10*a*-10*d*) is removably held, and wherein:

the movable panel (1*e*) can be arranged at least: in a first spatial orientation corresponding to a first configuration of the second module (1'), optionally in which the displaying surface mainly extends orthogonally to a depth axis of said second module (1') and frontally with respect to a user of the second module (1'); and in a second spatial orientation rotated, preferably substantially orthogonally, with respect to the first spatial orientation and corresponding to a second configuration of the second module (1'), optionally in which the displaying surface extends parallel to the depth axis of said second module (1'), and/or wherein the movable panel (1*e*) can be arranged at least in correspondence of a first position at a first distance with respect to a lateral end of the second module (1') and in correspondence of a second position at a second distance, different from the first distance, with respect to the lateral end of the second module (1'), optionally by translation, and/or wherein the movable panel (1*e*) can be moved in a composite movement comprising a rotation with respect to a vertical axis thereof and/or a translation in a direction substantially orthogonal to said vertical axis.

According to the present disclosure a display kit is disclosed; the kit comprises a system according to one or more of the aspects herein disclosed and further comprising at least one, preferably a plurality of, hydrothermal sanitary components (10*a*-10*d*).

According to another non-limiting aspect, said at least one, preferably a plurality of, hydrothermal sanitary components (10*a*-10*d*) is a full-scale model replicating the visible part of the real, operative, corresponding component or a part of the real, operative, corresponding component.

According to another non-limiting aspect, the hydrothermal sanitary component (10*a*-10*d*) comprises at least one retention pin (10*p*) arranged at a rear portion of the hydrothermal sanitary component (10*a*-10*d*), the retention pin (10*p*) being configured to couple with a shaped through hole (2*f*) of the exhibition panel (2).

According to another non-limiting aspect, the hydrothermal sanitary component (10*a*-10*d*) comprises at least one shaped through hole (2*f*) practiced on a rear portion of the hydrothermal sanitary component (10*a*-10*d*), the shaped through hole (2*f*) is configured to couple with a retention pin (10*p*) arranged on the exhibition panel (2), optionally at a front surface of the exhibition panel (2).

According to another non-limiting aspect, the hydrothermal sanitary component (10*a*-10*d*) is configured to be removably connected to the exhibition panel (2) through a bayonet-like connection and/or the retainer (2*f*, 4, 10*p*, 11) is configured to realize a bayonet-like connection between the exhibition panel (2) and the hydrothermal sanitary component (10*a*-10*d*). According to another non-limiting aspect, the kit comprises a compensation element (10*t*), configured to compensate a local distortion or deformation of said exhibition panel (2); the compensation element (10*t*) being interposed and/or sandwiched between the exhibition panel (2) and the hydrothermal sanitary component (10*a*-10*d*), and/or directly contacting the exhibition panel (2), at a first side, and the hydrothermal sanitary component (10*a*-10*d*) at a second side different from said first side.

According to another non-limiting aspect the compensation element (10*t*) is integral with the hydrothermal sanitary component (10*a*-10*d*).

According to another non-limiting aspect, the hydrothermal sanitary component (10*a*-10*d*) comprises a compensation element (10*t*), configured to compensate a local distortion or deformation of said exhibition panel (2); the compensation element (10*t*) being interposed and/or sandwiched between the exhibition panel (2) and the hydrothermal sanitary component (10*a*-10*d*), and/or directly contacting the exhibition panel (2), at a first side, and the hydrothermal sanitary component (10*a*-10*d*) at a second side different from said first side. According to another non-limiting aspect, the compensation element (10*t*) is removably connected to said hydrothermal sanitary component (10*a*-10*d*).

According to another non-limiting aspect, the compensation element (10*t*) is arranged at a rear portion, in particular at a rear end portion, of the exhibition panel (2).

According to another non-limiting aspect, the compensation element (10*t*) is a triangular and/or a wedge-like element configured to modify or compensate an inclination or distortion or deformation of the exhibition panel (2), optionally being configured to modify or compensate said inclination or distortion or deformation for a predetermined compensation angle ($\alpha$), optionally wherein said compensation angle ($\alpha$) at least partially compensates a distortion or deformation or inclination angle ($\beta$) locally assumed by the exhibition panel (2) due to a weight and/or a lever force at least locally exerted on the exhibition panel (2) by the hydrothermal sanitary element (10*a*-10*d*).

According to another non-limiting aspect, the retainer (2*f*, 4, 10*p*, 11) comprises at least one retention pin (10*p*) arranged on the exhibition panel (2), optionally protruding from a front surface of the exhibition panel (2), the retention pin (10*p*) being configured to couple, in use, with a shaped through hole (2*f*) practiced on said compensation element (10*t*).

According to another non-limiting aspect, the retainer (2*f*, 4, 10*p*, 11) comprises at least one shaped though-hole (2*f*) practiced on said exhibition panel (2); the shaped through hole (2*f*) being configured to couple, in use, with a retention pin (10*p*) arranged at a rear portion of the compensation element (10*t*).

The present disclosure further discloses the use of the display system according to one or more of the aspects herein described for displaying at least one, preferably a plurality of, hydrothermal sanitary components (10*a*-10*d*).

In particular, according to another aspect it is disclosed the use of a display system according to one or more of the preceding claims to arrange a plurality of hydrothermal sanitary components (10*a*-10*d*) on the exhibition panel (2) according to at least one user-defined and re-definable pattern or spatial configuration, simulating a real installation of said hydrothermal sanitary components (10*a*-10*d*) in an operating environment, such as a bathroom or similar.

According to another non-limiting aspect, the hydrothermal sanitary component (10*a*-10*d*) comprises at least one of the items of the following list: a sink, a faucet, a controlling valve of a faucet, a water distributor of a faucet, a towel rack or holder, a toilet, a showerhead, a part of a showerhead, a bidet, a boiler, a part of a bathtub, a water thermal heater, optionally configured to hold towels, a mirror, a soap holder, a toothpaste and/or toothbrush holder, a water paper holder, a tile.

Another object of the present disclosure is a method for displaying hydrothermal sanitary components (10*a*-10*d*), said method comprising using a display system (1, 1') according to one or more of the aspects herein disclosed to perform a step of removable engagement of at least hydrothermal sanitary component (10*a*-10*d*) with said exhibition panel (2) of the first module (1) of the system.

Another object of the present disclosure is a method for displaying hydrothermal sanitary components (10*a*-10*d*), the method comprising at least a step of removable engagement of at least one hydrothermal sanitary component (10*a*-10*d*) with an exhibition panel (2) of a first module (1) of a display system (1, 1') by at least a retainer (2*f*, 4, 10*p*, 11) configured to realize a removable connection between the exhibition panel (2) and the hydrothermal sanitary components (10*a*-10*d*), wherein the exhibition panel (2) is specifically destined and configured for supporting a plurality of hydrothermal sanitary components (10*a*-10*d*), and wherein the step of removable engagement, when the hydrothermal sanitary components (10*a*-10*d*) are removably engaged with the exhibition panel (2), determines a user-defined and re-definable pattern or spatial configuration of the hydrothermal sanitary components (10*a*-10*d*) on the exhibition panel (2) simulating a real installation of said hydrothermal sanitary components (10*a*-10*d*) in an operating environment, such as a bathroom or similar.

According to another non-limiting aspect, the step of removable engagement comprises magnetically coupling at least one of said hydrothermal sanitary components (10*a*-10*d*) to a front face of the exhibition panel (2), optionally by coupling a magnetic retention element (4) arranged on a back surface of said hydrothermal sanitary component (10*a*-10*d*) with the front face of the exhibition panel (2).

According to another non-limiting aspect, the step of removable engagement comprises magnetically coupling at least one of said hydrothermal sanitary components (10*a*-10*d*) to a magnetic face of the exhibition panel (2) or to a magnetic retention element (11) arranged at the exhibition panel (2).

According to another non-limiting aspect, the step of removable engagement comprises mechanically coupling at least one of said hydrothermal sanitary components (10*a*-10*d*) to a front face of the exhibition panel (2) by at least one hooking element (4) arranged on the front face of the exhibition panel (2)

According to another non-limiting aspect, the step of removable engagement comprises arranging and repeatedly re-arranging multiple times the pattern or spatial configuration of the hydrothermal sanitary components (10*a*-10*d*) on the exhibition panel.

According to another non-limiting aspect, the step of removable engagement comprises the engagement of at least one hydrothermal sanitary component (10*a*-10*d*) with the exhibition panel (2) of the first module (1) the a display system (1, 1') referring to, or with respect to, a plurality of marking elements (3) arranged at specific positions on the exhibition panel (2), optionally at a front surface of the exhibition panel (2) and/or visually detectable on the front surface of the exhibition panel (2).

According to another non-limiting aspect, the plurality of marking elements (3) realize a predefined visual aiding pattern helping an arrangement of at least one hydrothermal sanitary component (10*a*-10*d*) on the exhibition panel (2).

According to another non-limiting aspect, the plurality of marking elements (3) comprise at least one light-emitting module, having at least one operative configuration wherein it does not emit light, and a second operative configuration wherein it emits light, and the method further comprises the step of configuring, or switching, the at least one light-emitting module in the second operative configuration, and referring to the plurality of marking elements (3) comprises referring to the light emitted by the at least one light-emitting module.

According to another non-limiting aspect, the light-emitting module, in the second operative configuration, emits light in the direction of observation of a user arranged substantially in front of said exhibition panel (2).

According to another non-limiting aspect, the method further comprises a step of selection of at least one hydrothermal sanitary component (10*a*-10*d*) from a second module (1') of a display system (1, 1'), the step of selection taking place before the step of removable engagement.

According to another non-limiting aspect, the step of selection comprises at least one of the following steps:

moving at least one movable panel (1*e*) of the second module (1'), wherein the movable panel (1*e*) comprises a displaying surface at which at least one hydrothermal sanitary component (10*a*-10*d*) is removably engaged, between a first spatial orientation corresponding to a first configuration of the second module (1'), optionally in which the displaying surface mainly extends orthogonally to a depth axis of said second module (1') and frontally with respect to a user of the second module (1'), and a second spatial orientation rotated, preferably substantially orthogonally, with respect to the first spatial orientation and corresponding to a second configuration of the second module (1'), optionally in which the displaying surface extends parallel to the depth axis of said second module (1'), and/or comprises moving at least one movable panel (1*e*) of the second module (1') between a first position at a first distance with respect to a lateral end of the second module (1') and a second position at a second distance, different from the first distance, with respect to the lateral end of the second module (1'), optionally by translation, and/or comprises moving at least one movable panel (1*e*) of the second module (1') by making it perform a composite movement comprising with respect to a vertical axis thereof and/or a translation in a direction substantially orthogonal to said vertical axis.

According to another non-limiting aspect, the retainer (2*f*, 4, 10*p*, 11) is configured to realize a bayonet-like connection, in particular a bayonet-like removable connection, between the exhibition panel (2) and the hydrothermal sanitary component (10*a*-10*d*) and comprise at least one retention pin (10*p*) and at least one shaped through hole (2*f*) alternatively arranged on the exhibition panel (2) and on the hydrothermal sanitary component (10*a*-10*d*).

According to another non-limiting aspect, the step of removable engagement comprises:

engaging at least one retention pin (10*p*) arranged at, or of, the hydrothermal sanitary component (10*a*-10*d*) with the corresponding shaped through hole (2*f*) practiced on the exhibition panel (2); or engaging at least one retention pin (10*p*) arranged at, or of, the exhibition panel (2) with the corresponding shaped through hole (2*f*) arranged at, or of, the hydrothermal sanitary component (10*a*-10*d*).

According to another non-limiting aspect, said bayonet-like connection comprises the relative motion of the retention pin (10*p*) with respect to the shaped through hole (2*f*) along a first axis and then along a second axis, inclined, in particular orthogonal, to the first axis.

According to another non-limiting aspect, the relative motion causes the displacement of at least one retention head of the retention pin (10*p*) from a first portion of said shaped through hole (2*f*) configured to allow the passage of the retention head to a second portion of said shaped through hole (2*f*) configured to allow the passage of an elongated body of the retention pin (10*p*) to which the retention head is rigidly connected, and configured to impede the extraction of the retention head along said first axis.

According to another non-limiting aspect, the method comprises the provision of a compensation element (10*t*), configured to compensate a local distortion or deformation of said exhibition panel (2), between the exhibition panel (2) and the hydrothermal sanitary component (10*a*-10*d*).

According to another non-limiting aspect, the provision of said compensation element (10*t*) is performed before the step of removable engagement of the hydrothermal sanitary component (10*a*-10*d*) with the exhibition panel (2); the step of removable engagement causing the interposition or the sandwiching of said compensation element (10*t*) between the exhibition panel (2) and the hydrothermal sanitary component (10*a*-10*d*).

According to another non-limiting aspect after the step of removable engagement, the compensation element (10*t*) directly contacts the exhibition panel (2), optionally a front surface of the exhibition panel (2), at a first side and directly contacts, at a second side, the hydrothermal sanitary component (10*a*-10*d*) optionally at a rear portion thereof.

According to another non-limiting aspect, the step of provision of the compensation element (10*t*) allows to compensate at least a local distortion or deformation or inclination of the hydrothermal sanitary element (10*a*-10*d*) with respect to exhibition panel (2), optionally allowing to compensate a local distortion or deformation or inclination for a predetermined compensation angle ($\alpha$), optionally wherein said compensation angle ($\alpha$) at least partially compensates a distortion or deformation or inclination angle ($\beta$) locally assumed by the exhibition panel (2) due to a weight and/or a lever force at least locally exerted on the exhibition panel (2) by the hydrothermal sanitary element (10*a*-10*d*).

DRAWINGS

In the subsequent detailed description, at least one preferred and non-limiting embodiment of the object of the present disclosure will be described, and the description will be referred to the annexed figures wherein:

FIG. 1 shows a front view of a first module of a display system according to the present disclosure;

FIG. 2 shows a section view along the lines 1-1 of FIG. 1, according to a first non-limiting embodiment;

FIG. 3 shows a section view along the lines 1-1 of FIG. 1, according to a second non-limiting embodiment;

FIG. 5 shows a partial section view of a particular embodiment of a exhibition panel which is part of the display system according to the present disclosure;

FIG. 6 shows a perspective view of a particular type of connection between a hydrothermal component and the exhibition panel, this connection being realized though retention pins; and FIG. 7 shows a section view of a hydrothermal component connected to the exhibition panel.

DETAILED DESCRIPTION

Figure 4:
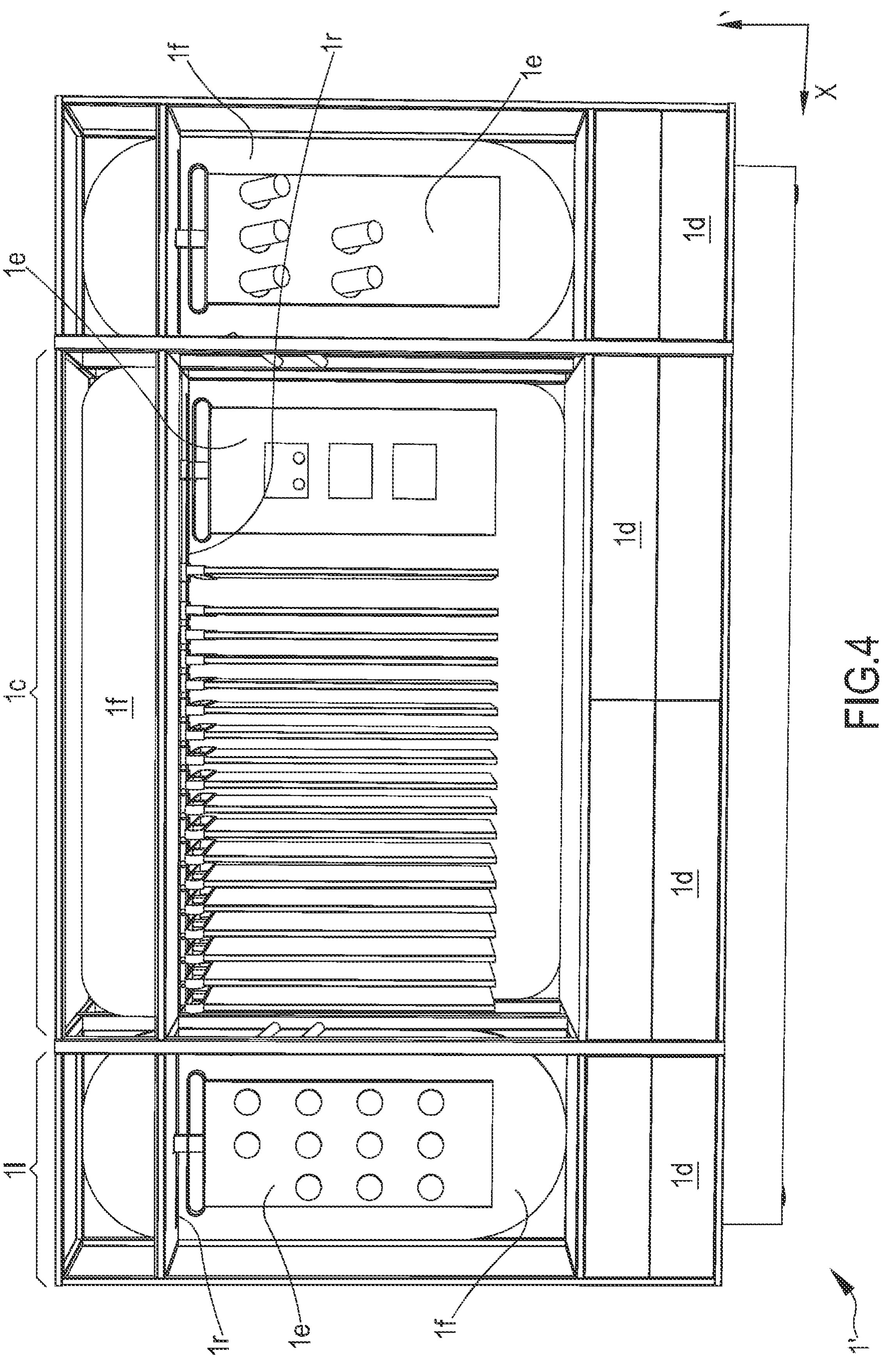
FIG. 4 shows a front view of a second module of a display system according to the present disclosure.

FIG. 1 shows a front view of a display system 1, 1' configured to allow a user arrange at least one, and preferably a plurality of, hydrothermal sanitary components 10*a*-10*d* according to a predefined and re-definable, in particular a user re-definable spatial configuration by a detachable engagement with an exhibition panel or screen which is part of said system.

The hydrothermal sanitary components 10*a*-10*d* disclosed in the present description may comprise at least one of the articles belonging to the following list: a sink, a faucet, a controlling valve of a faucet, a water distributor of a faucet, a towel rack or holder, a toilet, a showerhead, a part of a showerhead, a bidet, a boiler, a part of a bathtub, a water thermal heater, optionally configured to hold towels, a mirror, a soap holder, a toothpaste and/or toothbrush holder, a water paper holder, a tile, or other products which may be installed in a bathroom. It is thus clear that, for the purpose of the present description, the hydrothermal sanitary components may comprise heating articles or components which may include for instance the aforementioned the water thermal heater or boiler and may comprise water distribution articles which may include for instance the faucet and/or the controlling valve of the faucet. Thus, the differentiation between the "water distribution article", or component and the "heating article", or component, mainly refers to the principal destination of use of such article.

In the present application, the wording "hydrothermal sanitary components" will be used to refer to any of the aforementioned products.

In detail, reference numbers 10*a*-10*d* that are used in the present disclosure refer to: a showerhead (10*a*), a water flow regulating system for a showerhead (10*b*), a water flow regulating system for a bathtub (10*c*) and a regulating system for a faucet (10*d*). It may be noted that those items are full-scale models whose size, at least for the portions which can be seen by the user when in use, precisely copies that of the real corresponding devices; anyway, for the purpose of allowing the detachable engagement herein disclosed, the aforementioned items may be deprived of non-visible parts which may protrude backward, and which in use lie within the walls when the device is actually installed in a bathroom; those parts may, in a non-limiting extent, include valve assemblies, bolts, wirings, lights, electrical switching cases and water conduits. In other words, those items are full-scale models of real hydrothermal sanitary components 10*a*-10*d* that replicate and allow—if so provided—the motion of any visible part or actuator of the fully functioning component.

It may be noted that the hydrothermal sanitary component may comprise electrical connections; when present, in at least a preferred and non-limiting embodiment, the electrical connections may be at least partially, preferably fully, operative at least for providing the illumination of at least one part, optionally a plurality of parts of the hydrothermal sanitary component. This operation may be realized through a normal plug and socket connection to an AC distribution network and/or through a low voltage power supply.

The display system 1, 1' that is object of the concepts herein, in an embodiment, is provided with a first module 1 and a second module 1' which are, each one, of a floor standing type and which are configured to be arranged at separate, even remote, positions one with respect to the other. The first module 1 has the purpose of allowing a user create a particular configuration of hydrothermal sanitary components that may simulate the real spatial configuration they will have once installed in a real bathroom, while the second module 1' has the main purpose of housing a plurality of articles, in particular hydrothermal sanitary components arranged per category; the user can thus choose one or more component belonging to one or more categories for then arranging them at his will at the first module 1.

Preferably, the first module 1 comprises an exhibition panel 2, which is specifically destined and configured for supporting a plurality of models of said hydrothermal sanitary components.

The main purpose of the exhibition panel is to allow a user to realize a plurality of user-defined, and re-definable, patterns or spatial configurations of hydrothermal sanitary components.

The exhibition panel 2 is further provided with front surface delimited by an outer perimeter, and at least one retention element may be provided on the hydrothermal sanitary component and/or on the exhibition panel 2 for allowing the aforementioned removable connection of the hydrothermal sanitary components 10*a*-10*d*. In particular, in an embodiment, the connection of the exhibition panel 2 and at least one hydrothermal sanitary component is of a direct type (in other words, a direct engagement).

Since the exhibition panel 2 substantially simulates a wall of a part of a bathroom, in an embodiment said exhibition panel 2 is mainly configured to be installed in a substantially vertical configuration, i.e. to lay at least partially on a plane which is almost orthogonal to the horizontal plane. Nonetheless, the wording “substantially vertical” shall not be intended to be limiting, since in a more general extent the exhibition panel 2 may be arranged to lay at least partially on a plane substantially inclined with respect to a horizontal plane.

In an embodiment, which is represented in FIG. 1 and which shall not be considered limiting, the front surface of the exhibition panel 2 is planar. In other embodiments, which are not represented in the annexed figures, the exhibition panel 2 may be a curved exhibition panel. This latter may for instance simulate the wall of a partially circular shower space. The annexed figures show a front exhibition panel in a form of a thin net-like exhibition panel, but this particular configuration shall not be intended as limiting. In an embodiment, the size of the first module 1 is such that the exhibition panel 2 may extend at least for a height above 140 or 150 cm, more preferably above 160 or 170 cm, or even more preferably above 180 cm and 190 cm. Thanks to this feature, at least one of the hydrothermal sanitary components 10*a*-10*d* may be arranged at a height approximately of 140-150 cm, which is the height of a substantial straight sight of a normal user at a certain distance.

The first device or module 1 comprises at least a retainer 4, 11 configured to realize a removable connection between the exhibition panel 2 and the hydrothermal sanitary components and further configured to allow a user to arrange and repeatedly re-arrange, multiple times, the hydrothermal sanitary components on the exhibition panel.

Several patterns or spatial configurations may be thus realized, and the device may be further configured to allow a simulation of a real installation of the hydrothermal sanitary components in an operating environment (e.g. a bathroom or similar).

The retainer 4, 11 may comprise first retention elements 4 and/or second retention elements 11, whose technical features will be described in the subsequent portion of description.

As it is shown in FIG. 2, in an embodiment the exhibition panel 2 is, or comprises, a metal exhibition panel 2 or anyway a magnetically attractable exhibition panel 2; a plurality of retention elements in a form of magnets 4, configured and destined to be arranged on a rear surface of each hydrothermal sanitary component 10*a*-10*d* may be attracted to the exhibition panel 2 by exerting a sufficient friction force to contrast the gravity and allowing the hydrothermal sanitary component 10*a*-10*d* to stay at the position at which the user arranges it. In an embodiment, which is clearly non-limiting, the magnets 4 are irremovably engaged to the hydrothermal sanitary component.

The Applicant has noticed that arranging the magnets 4 at the rear surface or wall of each hydrothermal sanitary component 10*a*-10*d* allows hiding the magnets 4 from the sight of the user, especially when this latter observes the overall assembly from a substantially frontal point of view. Thus, arranging the magnets 4 at the rear surface or wall of each hydrothermal sanitary component 10*a*-10*d* allows keeping unaltered the overall aesthetic impression of the arrangement of the hydrothermal sanitary component 10*a*-10*d* on the surface of the exhibition panel 2. Preferably, albeit in a non-limiting extent, the magnet 4, or when in a plurality, the magnets 4, extend on the whole rear surface of each hydrothermal sanitary component 10*a*-10*d*.

It is thus clear that the magnets 4 (and as well the front surface of the exhibition panel 2) may be configured and destined to directly contact the front surface of the exhibition panel 2, allowing the aforementioned removable connection.

In another non-limiting embodiment, which is not represented in the annexed figures, the second retention elements 11 may be provided, at least in use, in correspondence of the exhibition panel 2. In an embodiment, the exhibition panel 2 itself may be either magnetic or may comprise one or several magnets arranged according to a predetermined pattern or reciprocal displacement scheme or spatial configuration all along the surface of the exhibition panel 2 or, for instance and in a non-limiting extent, for at least for ¾ of the overall surface of the exhibition panel 2. In this latter case, it may be sufficient that the rear surface of each hydrothermal sanitary component 10*a*-10*d* is provided or realized in a magnetically attractable material for making the detachable magnetic connection be possible.

Alternatively, in still another non-limiting embodiment (FIG. 3), the exhibition panel 2 may be provided with second retention elements 11 in a form of hook-like elements 11 arranged according to a predefined spatial configuration or according to a predefined pattern on the front surface of the exhibition panel 2. The hook-like elements 11 are configured to sustain at least one hydrothermal sanitary component 10*a*-10*b*. Also in this case it may be preferable that once the hydrothermal sanitary component is properly connected to the hook-like element 11, this latter substantially disappears from the sight of a user, by being encased or anyway hidden behind the rear surface of the component.

In an embodiment, illuminating elements, e.g. LED light spots, may be provided on the top and/or on at least part of the lateral walls of the exhibition panel 2 to provide proper illumination to the front wall and to the components that may be connected thereto.

In a preferred and non-limiting embodiment, the exhibition panel 2 may be provided with a plurality of marking elements 3, arranged at specific positions on the exhibition panel. In the embodiment of FIG. 1, the marking elements 3 are arranged at the front surface of the exhibition panel and are visually detectable by the user at least when he is positioned substantially frontally with respect to the front surface of the exhibition panel 2.

In an embodiment, the marking elements 3 may be physically disconnected from the exhibition panel.

The marking elements 3 are conceived for realizing a predefined visual aiding pattern helping the arrangement of at least one hydrothermal sanitary component 10*a*-10*d* on the exhibition panel 2. In detail, this pattern is preferably symmetrical with respect at least to the left and right end of the exhibition panel 2.

In the non-limiting embodiment shown in FIG. 1 the marking elements 3 are substantially round pins which are substantially co-planar with the front surface of the exhibition panel, so as to not to interfere with the proper engagement of any hydrothermal sanitary component 10*a*-10*d* at any position. This configuration shall not be intended as limiting, as the marking elements 3 could be in a form, for instance, of a plurality of lights arranged behind the front surface of the exhibition panel. In this latter a case the marking elements 3 may thus be in the form of at least one light-emitting module which has at least a first operative configuration wherein it does not emit light and a second operative configuration wherein it emits light. In a preferred albeit non-limiting embodiment, the light-emitting module may be dimmable and thus it may be configured in several operative configurations of dimmed light emission. This at least light-emitting module may be configured to radiate light at least in a direction that is, at least locally, orthogonal to the plane on which, at least locally, lays the exhibition panel 2.

Preferably, albeit in a non-limiting extent, the marking elements 3 may comprise at least a part of the second retention elements 11 or may spatially differ or may be physically detached, from the second retention elements 11.

Alternatively or in combination with the aforementioned configurations, the marking elements 3 may further comprise at least one, preferably a plurality of, strip-like elements, in particular flexible and/or deformable strip-like elements. The strip-like elements may be removably connected to the front surface of the exhibition panel 2. For instance, the strip-like elements may be connected to the front surface of the exhibition panel 2 through a magnetic connection. These latter elements may of several thicknesses and/or colors, and in a non-limiting extent, may be configured to allow a technical user to visually draft spatial arrangements of conduits and/or electrical wirings, simulating the real arrangement of conduits and/or electrical wirings that actually will be used for properly feeding the hydrothermal components.

As shown in FIG. 5, an embodiment of the first module 1 is provided with an exhibition panel 2 comprising a front element and a back element 2*r* laying on a plane parallel to the plane at which the front element lays. The front element, which in FIG. 5 is identified by the reference number 2, is actually the element at which there is the physical contact with the hydrothermal sanitary components 10*a*-10*d* takes place. Preferably, albeit in a non-limiting extent, the rear element 2*r* is the element which most provides robustness to the exhibition panel 2, and which actually allows to make the exhibition panel 2 sufficiently resistant to withstand several kilograms of hydrothermal sanitary components 10*a*-10*d* attached thereto.

The front element and the rear element may be coupled together with several techniques, among which a non-limiting example includes the presence of a plurality of plugs passing through through holes of the exhibition panel 2 between the front surface of the front element and the rear face of the rear element. The plugs may be, or may be integral with, the marking elements 3. In this latter case, it is clear that the marking elements 3 can be removed from the exhibition panel 2. FIG. 5 shows a particular embodiment of the marking element 3 whose rear portion comprises a retaining portion 3*f* suitable to keep the rear element 2*r* firmly against the front element of the exhibition panel 2; thus it may be inferred that the front and the rear element are in a reciprocal contact. The retaining portion 3*f* introduces in the through holes preferably with a bayonet-like coupling.

The Applicant has further noticed that sometimes the hydrothermal components may comprise items that provide a relevant lever force on the exhibition panel 2 when connected thereto; this lever force can be the result of the weight of the hydrothermal component and/or can be the result of the particular shape of the item. For instance a particularly long showerhead, in particular when realized in metal, may have a significant weight and, as well, due to its proportions, may exert a relevant lever force. For such hydrothermal components, the Applicant has conceived a particular type of retainer that help to provide a firm and stable removable connection with the exhibition panel 2 also for heavy and/or long components. This particular type of retainer is well represented in FIGS. 6 and 7.

In detail, FIGS. 6 and 7 show a non-limiting type of hydrothermal component, in particular a long showerhead, provided with nozzles 10*u* arranged preferably in correspondence of a frontal end portion. At the opposite rear end portion, which is the portion substantially closer to the exhibition panel, the hydrothermal component is provided with at least one retention pin 10*p* provided with an elongated body, in the depicted embodiment substantially cylindrical, and provided with a retention head, having a size, in particular a diameter, larger than the diameter of the elongated body. Preferably, at least a couple of left, right retention pins 10*p* is present on the hydrothermal sanitary component, in order to provide a suitable removable connection stability with the exhibition panel 2.

The retention pin 10*p* can be realized in several materials, but in a preferred and non-limiting embodiment, it is realized in metal, e.g. in steel.

The retention pin 10*p* is configured for being introduced in a shaped through hole identified with the reference number 2*f*, thus realizing a bayonet-like coupling. The shaped through hole 2*f* is arranged at the exhibition panel 2. When in a configuration with a front element and rear element 2*r*, the shaped through hole 2*f* is realized on both said elements.

In fact, the shaped through hole 2*f* is provided with a first, larger, portion suitable to allow the introduction of the retention head of the retention pin 10*p*, and a second, smaller, portion that is configured to allow the introduction of the elongated body. As it may be apparent from FIG. 6, the shape of the through hole 2*f* may be similar to that of a keyhole.

In other words, the bayonet-like connection here described comprises the relative motion of the retention pin 10*p* with respect to the shaped through hole 2*f* along a first axis and then along a second axis, inclined, in particular orthogonal, to the first axis. The relative motion causes the displacement of at least one retention head of the retention pin 10*p* from a first portion of said shaped through hole 2*f* configured to allow the passage of the retention head to a second portion of said shaped through hole 2*f* configured to allow the passage of an elongated body of the retention pin 10*p* to which the retention head is rigidly connected, and configured to impede the extraction of the retention head along said first axis.

It may be noted that the extension of the elongated body shall be sufficient to pass the thickness of the exhibition panel 2, also when this latter comprises the back element 2*r*.

It may be further noted that the shaped through holes 2*f* may be the same through holes configured for holding the plugs or, alternatively, they may be other holes.

In this way, when the user wants to connect the hydrothermal component 10*a* with the panel, in a first step of motion the user axially aligns the retention head of the retention pin 10*p* with the first portion of the shaped through hole 2*f*, and then performs a second step of motion in which he moves slightly the hydrothermal component 10*a* downwardly, or in any case in a direction inclined, in particular, substantially orthogonal to the aforementioned axial alignment, thus reaching the bottom of the second portion. The extraction of the hydrothermal component is thus impeded by virtue of the contrast of the retention head with the part of the wall surrounding the second portion.

Even if the present description relates to a configuration wherein the retention pins 10*p* are provided on the hydrothermal component, it shall be noted that also the opposite configuration could be realized: the retention pins 10*p* could be arranged on the exhibition panel 2 (in particular, frontally protruding from the front surface of the exhibition panel 2), and respective shaped holes could be provided on the hydrothermal component, in particular at the rear part thereof.

The Applicant has further observed that in some cases the weight and/or the lever force exerted by the hydrothermal component is sufficient to at least locally distort, or deform, the exhibition panel 2. The distortion or deformation or inclination may result in a deformation or inclination or distortion angle β (shown in FIG. 7) between a portion of the exhibition panel 2, at least the portion close to the hydrothermal component, and the rest of the plane on which the exhibition panel 2 lays or in an overall inclination of the whole exhibition panel 2.

When the hydrothermal component shall be installed orthogonally with respect to the exhibition panel 2, for instance for providing a particular aesthetic effect, this distortion or deformation may result in an improper alignment between the hydrothermal component and the exhibition panel 2. In a particular configuration wherein the exhibition panel 2 is vertical and the hydrothermal component, for instance the showerhead should be parallel to the ground, the distortion or deformation may result in the showerhead pointing downwardly.

The Applicant has thus conceived a compensation element 10*t*, which is arranged at the rear end portion of the hydrothermal component, and this latter element is conceived to compensate the local distortion or deformation or inclination of the exhibition panel 2 in order to allow the hydrothermal component be arranged a final predetermined orientation with respect to the overall exhibition panel 2 notwithstanding the aforementioned distortion or deformation.

The compensation element 10*t*, which for the purposes of the present description may be also called inclination compensation element or distortion or deformation compensation element, in use is configured to contact the front surface of the exhibition panel 2 and in a particular and non-limiting embodiment, which is the embodiment shown in FIGS. 6 and 7, the compensation element 10*t* is substantially a triangular, or wedge-like, element causing an inclination of a predetermined compensation angle α which, at least theoretically, compensates the deformation, distortion or inclination angle β.

In an embodiment, the compensation element 10*t* is integral with the hydrothermal component, but this configuration shall not be intended as limiting, since in another embodiment the compensation element 10*t* may be an element which can be attached and removed from the hydrothermal sanitary component.

Preferably, albeit in a non-limiting extent, the width of the compensation element 10*t* is the same to that of the respective hydrothermal sanitary component.

The compensation element 10*t* may be provided either with a retention pin 10*p*, preferably a couple of retention pins 10*p*, or with at least one, preferably a plurality of, shaped through holes 2*f*. The conformation and operation of the retention pins or shaped through holes of the compensation element 10*t* is the same as above described, and therefore is not herewith repeated. Clearly, the presence of retention pins 10*p* or of shaped through holes 2*f* depends on the presence, at least on the exhibition panel 2, of the proper opposite retainer. It may be finally noted that in case the compensation element 10*t* can be disconnected from the hydrothermal sanitary component 10*a*-10*d*, and in case the hydrothermal sanitary component 10*a*-10*d* is provided with at least one retention pin 10*p*, or at least one shaped through hole 2*f* as above described, the compensation element 10*t* may be realized in one of the following alternative configurations:

- a first configuration wherein the compensation element 10*t* is provided at a first side (e.g. the side configured to lay against the exhibition panel 2) of at least one, preferably a plurality of, retention pins 10*p* configured to couple with at least one, preferably a plurality of, shaped through holes 2*f* of the exhibition panel 2, and at a second side (e.g. the side configured to lay against the rear side of the hydrothermal sanitary component 10*a*-10*d*) of at least one, preferably a plurality of, shaped through holes 2*f* configured to couple with at least one, preferably a plurality of, retention pins 10*p* of the hydrothermal sanitary component 10*a*-10*d*;
- a second configuration wherein the compensation element 10*t* is provided at a first side (e.g. the side configured to lay against the exhibition panel 2) of at least one, preferably a plurality of, shaped through holes 2*f* configured to couple with at least one, preferably a plurality of retention pins 10*p* of the exhibition panel 2, and at a second side (e.g. the side configured to lay against the rear side of the hydrothermal sanitary component 10*a*-10*d*) of at least one, preferably a plurality of, retention pins 10*p* configured to couple with at least one, preferably a plurality of, shaped through holes 2*f* of the hydrothermal sanitary component 10*a*-10*d*; or, further alternatively,
- a third configuration wherein the compensation element 10*t* is provided at a first side (e.g. the side configured to lay against the exhibition panel 2) of at least one, preferably a plurality of, shaped through holes 2*f* configured to couple with at least one, preferably a plurality of retention pins 10*p* of the exhibition panel 2, and at a second side (e.g. the side configured to lay against the rear side of the hydrothermal sanitary component 10*a*-10*d*) of at least one, preferably a plurality of, shaped through holes 2*f* configured to couple with at least one, preferably a plurality of, retention pins 10*p* of the hydrothermal sanitary component 10*a*-10*d*; or, further alternatively,
- a fourth configuration wherein the compensation element 10*t* is provided at a first side (e.g. the side configured to lay against the exhibition panel 2) of at least one, preferably a plurality of, retention pins 10*p* configured to couple with at least one, preferably a plurality of shaped through holes 2*f* of the exhibition panel 2, and at a second side (e.g. the side configured to lay against the rear side of the hydrothermal sanitary component 10*a*-10*d*) of at least one, preferably a plurality of, retention pins 10*p* configured to couple with at least one, preferably a plurality of, shaped through holes 2*f* of the hydrothermal sanitary component 10*a*-10*d*.

As shown in FIG. 4, the display system 1, 1' according to the present disclosure further comprises a second device or module 1'. It may be noted that the second module 1', which is a displaying module, has peculiar technical features that allow users select at least one among several hydrothermal sanitary components. The second module 1' also allows to store several hydrothermal sanitary components in a space-saving and effective way.

In accordance to the present disclosure, the second module 1' comprises a front portion, which is the portion at which the user typically stands to take one or more hydrothermal sanitary components 10*a*-10*d*, a left portion and an opposite right portion, a back portion, opposite to the front portion, a top portion and a bottom portion opposite to the top portion. The ideal line or axis joining the front and the back portions identifies a depth of the second module 1'. The ideal line or axis joining the right and left portion identifies a width axis of the second module 1'.

The second module 1' is configured for removably housing a plurality of hydrothermal sanitary components 10*a*-10*d* arranged and/or housed according to a predefined displaying pattern or configuration, and the plurality of hydrothermal sanitary components 10*a*-10*d* may be provided with several components grouped per category and/or type in the various storage or displaying spaces and surfaces of the second module 1'.

Among several features of the second module 1' a particular role is played by the presence of at least one movable panel 1*e* comprising a displaying surface at which at least one of said plurality of hydrothermal sanitary components 10*a*-10*d* is removably held. In particular, FIG. 4 shows a second module 1' provided with a plurality of movable panels 1*e*, in particular eighteen movable panels 1*e* arranged at a central portion 1*c* of the second module 1'.

The second module 1' shown in FIG. 4 further comprises two lateral portions 1*l*, one arranged at the right of the central portion 1*c* and one arranged at the left of the central portion 1*c*. Alternative embodiments may comprise only one lateral portion 1*l* arranged at the left or alternatively at the right of the central portion 1*c*. The movable panels 1*e* may be arranged also at the lateral portions 1*l*.

As shown in FIG. 4, each of the movable panels 1*e* may move, and in particular may perform a composite motion with respect to the left or right end portion of the second module 1'. In detail, each of the movable panels 1*e* may be arranged:

in a first spatial orientation corresponding to a first configuration of the second module 1' and in a second spatial orientation corresponding to a second configuration of the second module 1'.

In the first spatial orientation, the displaying surface of the movable panel 1*e* mainly extends orthogonally to a depth axis of the second module 1' and, thus, frontally with respect to a user of the second module 1'. In the second spatial orientation, the displaying surface of the movable panel 1*e* is rotated with respect to the orientation of the first spatial orientation, and is particularly rotated orthogonally. The second spatial orientation is such that the displaying surface of the movable panel 1*e* extends parallel to the depth axis of the second module 1*e*.

The transition between the first and the second configuration may take place with an uninterrupted, continuous transition through several intermediate configurations and corresponds to a rotation of the movable panel 1*e* around a vertical axis thereof.

Moreover, each of the movable panels 1*e* may move between a first position, at a first distance with respect to a lateral end (e.g. the left end) of the second module 1' and a second position, at a second distance with respect to the same lateral end of the second module 1'. This latter motion corresponds to a translation along a predetermined path, preferably in a direction which is axial and orthogonal to the depth axis of the second module 1' (width axis).

The Applicant notices that each of the movable panels 1*e* may thus perform a composite motion, in particular and non-limiting through the axial rotation. This composite motion allows for providing a very relevant number of movable panels 1*e* on the second module 1' while at the same time lateral extension of those panels can be saved with respect to a configuration wherein the same number of panels would be arranged in a juxtaposed configuration along a direction parallel to the width of the second element 1'. Moreover, such composite motion may allow the user to select one particular movable panel 1*e* among the plurality of panels, create a sufficient space to rotate the panel 1*e* by transversally distancing the remaining panels of said plurality of movable panels 1*e*, and then perform the aforementioned rotation. Thanks to this feature, the user observing the second module 1' frontally, not only can choose the specific type of component to move from the second module 1' to the first module 1, but can also easily and fully appreciate the aesthetic appearance of the selected hydrothermal sanitary component not only frontally but also in several lateral orientations without substantially any need of adapting the position held by the user with respect to the second module 1'.

For allowing the aforementioned composite motion, the second module, at least in the central portion 1*c*, may be provided with at least one rail 1*r*, which in the embodiment shown in FIG. 4 is arranged substantially at a top portion of the central portion 1*c* and allows for holding several movable panels 1*e* in a suspended configuration. The movable panels 1*e* are thus hinged to the rail and may slide along the same. In the embodiment shown in FIG. 4, the rail 1*r* extends mainly along a direction which is parallel to the direction of the width of the second module 1'.

Also the second module 1' may comprise at least a retainer 4, 11 configured to realize the removable connection of the movable panel 1*e* with hydrothermal sanitary components 10*a*-10*d*. The retainer is in detail provided with retention elements 11, corresponding to the disclosed second retention elements 11 previously cited in the present description, which is configured and destined to interact with at least one hydrothermal sanitary component or with at least one first retention element 4 coupled to a hydrothermal sanitary component to realize the removable connection.

As shown in the annexed figures, the movable panels 1*e* are provided with a hinging pin suitable to be connected to the respective rail 1*r* preferably, albeit in a non-limiting extent, in a non-disconnectable way. The movable panels 1*e* are indeed not intended or destined to be detachably disconnected from the respective module portion.

Preferably, the hinging pin is arranged in correspondence of a central top portion or side of the movable panel 1*e*, and in particular, as shown in the annexed figures, are arranged in correspondence of a symmetry axis of the movable panel 1*e*. In detail, it is noted that even if the movable panel 1*e* is depicted in a substantially rectangular shape, clearly thus having at least one symmetry vertical axis which constitutes the axis at which the hinging pin is arranged, this shape shall not be considered limiting.

Alternatively, in a configuration that is not represented in the annexed figures, at least the central portion 1*c* of the second module 1' may be provided with a plurality of rails 1*r* arranged in order to support the movable panels 1*e* from a top and from a bottom end.

In a preferred and non-limiting embodiment, the second module 1' may be provided with a plurality of drawers 1*d*, which preferably albeit in a non-limiting extent are arranged at a bottom portion of the second module 1'; this is the case represented in FIG. 4. In detail, FIG. 4 shows an embodiment wherein a set of four drawers 1*d* is at the central portion 1*c* of the second module 1, a set of two, vertically superimposed, drawers 1*d* is arranged at the left lateral portion 1*l* of the second module 1' and set of two, vertically superimposed, drawers 1*d* is arranged at the right lateral portion 1*l* of the second module 1'. In detail, in the central portion, the set of four drawers comprises two sub-sets of vertically superimposed drawers 1*d*.

In the embodiment represented in FIG. 4, each of the lateral portions 1*l* further comprises at least one movable panel 1*e* arranged with a displaying surface parallel to the width axis of the second module 1'. The movable panel 1*e* is held through a rail 1*r* of the same type of that disclosed for the central portion 1*c*, therefore the technical features of the rail, and/or of the connection of the movable panel with the rail, are not newly described.

The drawers may slide axially according to a direction which is parallel to a depth axis of the second module 1' and are configured to house a plurality of hydrothermal sanitary components 10*a*-10*d* according to a subdivision in several categories; for instance a first drawer contains only faucets, which may be arranged according to different color shades, while a second drawer contains only towel holders, which may be arranged according to color shades or size.

In a preferred and non-limiting embodiment, the second module 1' may comprise a frame, which may be realized in a metal material, e.g. Inox or chromed steel, in order to allow withstanding relevant weights. The frame supports the rails 1*r* and the drawers 1*d*. The frame of the second module 1' is thus configured and destined to be laid on the ground, in order to realize a floor-standing second module 1'.

The rails 1*r* may be integral with the main frame body or may be in a form of separate pieces that are attached to the main frame body.

In a preferred and non-limiting embodiment, the second module 1' may comprise a plurality of background exhibition panels identified in FIG. 4 by the reference number 1*f*. Those background exhibition panels 1*f* are conceived for the purposes of providing a predefined image background arranged behind the movable panels 1*e* that can visually enhance the appearance and technical and/or aesthetic features of each panel 1*e*. FIG. 4 shows a configuration wherein the background exhibition panels 1*f* are present both in the central portion 1*c* and in the two lateral portions 1*l* and are placed on the rear portion of the second module 1'. This configuration shall not be intended limiting, since several other configurations may be realized, wherein the background exhibition panel 1*f* is present only in the central portion 1*c*, or only in the lateral portions 1*l*, or only in one of the two lateral portions 1*l*, or in the central portion 1*c* and in one of the two lateral portions 1*l*.

In a preferred embodiment, the second module 1' may be of a modular type, and—as well—the central portion 1*c* and/or the lateral portions 1*l* of the second module 1' may be in turn realized as modular portions of the module. With this feature, several configurations with a wide variety of displaying sizes may be realized, and the user may adapt and shrink or widen the size of the second module 1' by simply and easily adding or removing one or more portions from the second module 1'.

In view of the present description, when users want to create a personalized configuration of at least one, preferably several, hydrothermal sanitary components 10*a*-10*d*, they perform a method of displaying hereinafter disclosed.

The main step of the method comprises a step of removable engagement, in turn comprising the engagement of at least one hydrothermal sanitary component 10*a*-10*d* with the exhibition panel 2 of the first module 1 of the display system. The engagement takes place by a retainer 4, 11 being part either of the exhibition panel 2 or (as in case of the magnets arranged on the rear surface of each of the hydrothermal sanitary components 10*a*-10*d*) of the hydrothermal sanitary component 10*a*-10*d*. Such retainer is configured to realize the aforementioned removable connection.

It is underlined that the step of removable engagement with the hydrothermal sanitary components 10*a*-10*d*, when these latter are removably engaged with the exhibition panel 2, determines a user-defined and re-definable pattern or spatial configuration of the hydrothermal sanitary components 10*a*-10*d*. The purpose of the aforementioned step of removable engagement is to provide a simulation of a real installation of the hydrothermal sanitary components in an operating environment, such as a bathroom or similar.

In an embodiment, the step of removable engagement is preceded by a step which comprises arranging the exhibition panel 2 at a spatial orientation such that it lays on a plane which is substantially inclined with respect to the horizontal plane, and—preferably—lies on a plane which is substantially vertical.

When the retainer 4 is of a magnetic type, the step of removable engagement comprises a step of magnetic removable engagement between at least one of the hydrothermal sanitary components 10*a*-10*d* and the exhibition panel 2. Said step in detail comprises magnetically coupling at least one of said hydrothermal sanitary components 10*a*-10*d* to a front face of the exhibition panel 2, preferably but in a non-limiting extent by coupling a magnetic retention element 4 arranged on a back surface of the hydrothermal sanitary component 10*a*-10*d* with the front face of the exhibition panel 2.

Alternatively, when the magnetic force is actively performed by the exhibition panel 2, the magnetic removable engagement takes place by magnetically coupling at least one of said hydrothermal sanitary components 10*a*-10*d* to a magnetic face of the exhibition panel 2 or to a magnetic retention element 11 arranged at the exhibition panel 2.

In a further alternative solution, when the magnetic engagement is not the technical solution adopted for performing the aforementioned removable engagement, the step of removable engagement comprises mechanically coupling at least one of said hydrothermal sanitary components 10*a*-10*d* to a front face of the exhibition panel 2 through at least one hooking element 4 arranged on the front face of the exhibition panel 2.

It may be noted that the step of removable engagement comprises the engagement of at least one hydrothermal sanitary component 10*a*-10*d* with the exhibition panel 2 is performed by making reference to, or equivalently with respect to, a plurality of marking elements 3 arranged at specific positions on the exhibition panel 2, optionally at a front surface of the exhibition panel 2 and/or visually detectable on the front surface of the exhibition panel 2, such that the proper arrangement of said hydrothermal sanitary component 10*a*-10*d* is realized also with respect to a predefined visual aiding pattern.

Of course before the removable engagement, the user performs a step of selection of at least one hydrothermal sanitary component 10*a*-10*d* from a second module 1', and the selection may be performed from one or more of the movable panels 1*e* or from one or more of the drawers 1*d* which may be present on the second module 1'.

Specifically referring to the selection from the movable panels 1*e*, the step of selection—in a non-limiting embodiment—comprises:

moving at least one movable panel 1*e* of the second module 1', wherein the movable panel 1*e* comprises a displaying surface at which at least one hydrothermal sanitary component 10*a*-10*d* is removably engaged, between a first spatial orientation corresponding to a first configuration of the second module 1') optionally in which the displaying surface mainly extends orthogonally to a depth axis of said second module 1' and frontally with respect to a user of the second module 1', and a second spatial orientation rotated, preferably substantially orthogonally, with respect to the first spatial orientation and corresponding to a second configuration of the second module 1', optionally in which the displaying surface extends parallel to the depth axis of said second module 1', and/or comprises moving at least one movable panel 1*e* of the second module 1' between a first position at a first distance with respect to a lateral end of the second module 1' and a second position at a second distance, different from the first distance, with respect to the lateral end of the second module 1', optionally by translation, comprises moving at least one movable panel 1*e* of the second module 1' by making it perform a composite movement comprising with respect to a vertical axis thereof and/or a translation in a direction substantially orthogonal to said vertical axis.

The step of selection thus ends with a physical disconnection of the selected hydrothermal sanitary component 10*a*-10*d* from the movable panel 1*e*.

Should the marking elements 3 be realized as a light-emitting elements or module, as above described, the method may comprise the step of configuring, or switching, said at least one light-emitting module in the second operative configuration, to create a lighted, visible, pattern, throughout the exhibition panel 2, in particular at least when the user is arranged substantially in front of the exhibition panel 2.

It may be noted that the system and method according to the present disclosure do not prevent using an interior design software program or an environment simulation software program specifically conceived to produce in output an overall configuration or rendering of an equipped bathroom or part of a bathroom. The system and method of the present disclosure may be thus used also in association with this software program, in order to check if actually the aesthetic appearance of the items arranged in the virtual bathroom of the software provide the same impression to the user if actually adopted, and in order to check if the real simulation of the real installation of the hydrothermal sanitary components in an operating environment actually produces a result which is comparable (or not) with the simulation obtained through the software.

It may be noted that the concepts herein are not limited to the embodiments represented in the drawings. It is thus clear that the reference signs put between parentheses that appear in the following claims for identifying specific items are provided for the sole purpose of increasing the intelligibility of the claims, and shall not be intended as limiting the scope of protection thereof.

It is finally clear that to the object of the claims several adaptations and additions may be carried out by a skilled person without for this departing from the scope of protection provided by the annexed claims.

The invention claimed is:

1. A display system comprising:

at least one hydrothermal sanitary component having a body and comprising at least a first retention element configured to sustain an entire weight of said at least one hydrothermal sanitary component at least in case said at least one hydrothermal sanitary component is an entire sink faucet, said at least a first retention element being irremovably engaged to said body and comprising at least one magnetic element;

a display device for hydrothermal sanitary components, comprising:

at least a first exhibition panel configured to lay, in use, at least partially on a plane substantially inclined with respect to a horizontal plane, said at least a first exhibition panel supporting said at least one hydrothermal sanitary component;

said at least a first retention element being configured to carry out a removable connection between said at least one hydrothermal sanitary component and said at least a first exhibition panel, said at least a first retention element being further configured to allow a user to arrange, and repeatedly re-arrange multiple times, said at least one hydrothermal sanitary component on the at least a first exhibition panel according to a plurality of user-defined and re-definable patterns or spatial configurations, simulating a real installation of said at least one hydrothermal sanitary component in an operating environment, such as a bathroom;

wherein at least one front surface of the at least a first exhibition panel is configured to interact with said at least a first retention element to carry out said removable connection;

wherein said at least a first exhibition panel comprises a plurality of marking elements arranged at specific positions at the at least one front surface of the at least a first exhibition panel, said plurality of marking elements define a visual aiding pattern to help an arrangement of said at least one hydrothermal sanitary component on said at least a first exhibition panel, the marking elements each comprise at least one light-emitting module, arranged behind the at least a first standing exhibition panel.

2. The display system according to claim 1, wherein:

the at least a first exhibition panel is floor standing and is provided with a supporting frame configured to be laid, or fixed, to the ground; and/or the exhibition panel is arranged and configured to lay, in use, at least partially on a plane which is substantially vertical with respect to the ground;

the exhibition panel has a substantially planar structure and/or has a substantially planar front face, the exhibition panel comprises an outer perimeter, when in use, said user-defined and re-definable patterns or spatial configurations are carried out within the outer perimeter and wherein said at least a first retention element is configured to allow the user to arrange, and repeatedly rearrange multiple times, the hydrothermal sanitary components on the exhibition panel in any position within the outer perimeter.

3. The display system according to claim 1, comprising at least a second retention element which is attached, optionally irremovably attached, or is part of, or is carried out integrally with, the exhibition panel, said at least a second retention element being configured to interact with said at least a first retention element coupled to said at least one hydrothermal sanitary component to carry out said removable connection.

4. The display system according to claim 3, wherein said at least a second retention element comprises at least one magnetic and/or at least one magnetically attractable element and/or wherein said at least a second retention element extends substantially along the entire surface of the exhibition panel or wherein said system comprises a plurality of second retention elements arranged according to a predefined pattern or spatial configuration on said exhibition panel, preferably reciprocally spaced and/or equally spaced.

5. The display system according to claim 1, further comprising a second exhibition panel configured to support said at least one hydrothermal sanitary component according to a predefined displaying pattern or configuration, the second exhibition panel comprising at least one movable panel having a displaying surface that is configured to support said at least one hydrothermal sanitary component and wherein:

the movable panel can be arranged at least: in a first spatial orientation corresponding to a first configuration of the second exhibition panel, optionally in which the displaying surface mainly extends orthogonally to a depth axis of said second exhibition panel with respect to a user of said second exhibition panel; and in a second spatial orientation rotated, preferably substantially orthogonally, with respect to the first spatial orientation and corresponding to a second configuration of the second exhibition panel, optionally in which the displaying surface extends parallel to the depth axis of said second exhibition panel, and/or wherein the movable panel can be arranged at least in correspondence of a first position at a first distance with respect to a lateral end of the second exhibition panel and in correspondence of a second position at a second distance, different from the first distance, with respect to the lateral end of the second exhibition panel, optionally by translation, and/or wherein the movable panel can be moved in a composite movement comprising a rotation with respect to a vertical axis thereof and/or a translation in a direction substantially orthogonal to said vertical axis.

6. The display system according to claim 5, wherein the second exhibition panel is floor standing and is provided with a supporting frame housing and/or realizing at least one rail configured for allowing the motion of the movable panel at least between the first and the second spatial orientation and/or at least between the first position and the second position, and/or wherein the at least one rail is configured for allowing the rotation of the movable panel around its vertical axis at least from the first spatial orientation to the second spatial orientation.

7. The display system according to claim 1, wherein at least one front surface of the exhibition panel is configured to directly contact at least a part of said first retention element to carry out said removable connection.

8. A display system comprising:

at least one hydrothermal sanitary component having a body and comprising at least a first retention element configured to sustain an entire weight of said at least one hydrothermal sanitary component at least in case said at least one hydrothermal sanitary component is an entire sink faucet, said at least a first retention element being irremovably engaged to said body and comprising at least one magnetic element;

a display device for hydrothermal sanitary components, comprising:

at least a first floor-standing, modular, exhibition panel configured to lay, in use, at least partially on a plane substantially inclined with respect to a horizontal plane, said at least a first floor-standing, modular, exhibition panel supporting said at least one hydrothermal sanitary component;

said at least a first retention element being configured to carry out a removable connection between said at least one hydrothermal sanitary component and said at least a first floor-standing, modular, exhibition panel;

said at least a first retention element being further configured to allow a user to arrange, and repeatedly re-arrange multiple times, said at least one hydrothermal sanitary component on the at least a first floor-standing, modular, exhibition panel according to a plurality of user-defined and re-definable patterns or spatial configurations, simulating a real installation of said at least one hydrothermal sanitary component in an operating environment, such as a bathroom;

wherein at least one front surface of the at least a first floor-standing, modular, exhibition panel is configured to interact with said at least a first retention element to carry out said removable connection;

wherein said at least a first floor-standing, modular, exhibition panel comprises a plurality of marking elements arranged at specific positions at the at least one front surface the at least a first floor-standing, modular, exhibition panel, said plurality of marking elements defines a visual aiding pattern to help an arrangement of said at least one hydrothermal sanitary component on said first floor-standing, modular, exhibition panel, the marking elements each comprise at least one light-emitting module, arranged behind the at least a first-floor standing, modular, exhibition panel.

9. A display system according to claim 8, wherein the at least a first floor-standing, modular, exhibition panel comprises a front element and a back element, said front element and the back element being co-planar and being in reciprocal contact; the display system comprising at least one plug keeping the front element and the back element in said reciprocal contact.

10. A display system according to claim 8, wherein said at least a first floor-standing, modular, exhibition panel is at least 140 cm or 150 cm or 160 cm or 170 cm or 180 cm or 190 cm high.

11. A display system comprising:

at least one hydrothermal sanitary component having a body and comprising at least a first retention element configured to sustain an entire weight of said at least one hydrothermal sanitary component at least in case said at least one hydrothermal sanitary component is an entire sink faucet, said at least a first retention element being irremovably engaged to said body and comprising at least one magnetic element;

a display device for hydrothermal sanitary components, comprising at least a first floor-standing exhibition panel configured to lay, in use, at least partially on a plane substantially inclined with respect to a horizontal plane, said at least a first floor-standing exhibition panel supporting said at least one hydrothermal sanitary component, said at least a first floor-standing exhibition panel being at least 140 cm high;

said at least a first retention element being configured to carry out a removable connection between said at least one hydrothermal sanitary component and said at least a first floor-standing exhibition panel, said at least a first retention element being further configured to allow a user to arrange, and repeatedly re-arrange multiple times, said at least one hydrothermal sanitary component on the at least a first floor-standing exhibition panel according to a plurality of user-defined and re-definable patterns or spatial configurations, simulating a real installation of said at least one hydrothermal sanitary component in an operating environment, such as a bathroom;

wherein at least one front surface of the at least a first floor-standing exhibition panel is configured to interact with said at least a first retention element to carry out said removable connection;

wherein said at least a first floor-standing, modular, exhibition panel comprises a plurality of marking elements arranged at specific positions at the at least one front surface the at least a first floor-standing, modular, exhibition panel, said plurality of marking elements defines a visual aiding pattern to help an arrangement of said at least one hydrothermal sanitary component on said first floor-standing, modular, exhibition panel, the marking elements each comprise at least one light-emitting module, arranged behind the at least a first-floor standing, modular, exhibition panel.

* * * * *